United States Patent
Jeong et al.

(10) Patent No.: US 10,003,995 B2
(45) Date of Patent: Jun. 19, 2018

(54) METHOD AND APPARATUS FOR CONTROLLING CONGESTION STATUS OF MOBILE COMMUNICATION NETWORK

(71) Applicant: Samsung Electronics Co., Ltd., Suwon-si, Gyeonggi-do (KR)

(72) Inventors: Sangsoo Jeong, Suwon-si (KR); Songyean Cho, Seoul (KR); Beomsik Bae, Suwon-si (KR); Hanna Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 654 days.

(21) Appl. No.: 14/204,432

(22) Filed: Mar. 11, 2014

(65) Prior Publication Data

US 2014/0254367 A1 Sep. 11, 2014

(30) Foreign Application Priority Data

Mar. 11, 2013 (KR) .................. 10-2013-0025483

(51) Int. Cl.
*H04W 28/02* (2009.01)
*H04L 12/927* (2013.01)
*H04L 12/825* (2013.01)

(52) U.S. Cl.
CPC ....... *H04W 28/0289* (2013.01); *H04L 47/263* (2013.01); *H04L 47/803* (2013.01); *H04W 28/0231* (2013.01)

(58) Field of Classification Search
CPC .............................................. H04W 28/0289
USPC ....................................................... 370/233
See application file for complete search history.

(56) References Cited

U.S. PATENT DOCUMENTS

| | | | |
|---|---|---|---|
| 2004/0052212 A1* | 3/2004 | Baillargeon | 370/235 |
| 2007/0183410 A1 | 8/2007 | Song et al. | |
| 2007/0280105 A1* | 12/2007 | Barkay | H04L 47/10 370/229 |
| 2009/0119773 A1 | 5/2009 | D'Amore et al. | |
| 2010/0103820 A1* | 4/2010 | Fuller et al. | 370/236 |

(Continued)

FOREIGN PATENT DOCUMENTS

| | | |
|---|---|---|
| CN | 101379729 A | 3/2009 |
| CN | 101889264 A | 11/2010 |

(Continued)

OTHER PUBLICATIONS

Interdigital Communications: "UE assisted congestion management based on application type", XP050681604, Nov. 1, 2012, vol. SA WG1, no. Edinburgh, UK.

(Continued)

*Primary Examiner* — Brian D Nguyen
*Assistant Examiner* — Abdullahi Ahmed
(74) *Attorney, Agent, or Firm* — Jefferson IP Law, LLP

(57) ABSTRACT

A method and an apparatus determining a policy by a Policy and Charging Rules Function (PCRF) is provided. The method of determining a policy by the PCRF includes receiving congestion status information of a network from a base station, transmitting the congestion status information to a content server, receiving a parameter for adjusting traffic transmission characteristics from the content server, and determining a policy related to traffic transmission based on the parameter.

32 Claims, 13 Drawing Sheets

(56) References Cited

U.S. PATENT DOCUMENTS

| | | | |
|---|---|---|---|
| 2010/0169808 A1* | 7/2010 | Yu | H04L 65/605 715/764 |
| 2010/0260179 A1 | 10/2010 | Bae et al. | |
| 2012/0236713 A1* | 9/2012 | Kakadia | H04L 41/5025 370/230 |
| 2013/0077491 A1* | 3/2013 | Cherian | H04L 69/22 370/235 |
| 2013/0223222 A1* | 8/2013 | Kotecha | H04L 43/16 370/235 |
| 2013/0272197 A1* | 10/2013 | Avila Gonzalez et al. | 370/328 |
| 2014/0003358 A1* | 1/2014 | Elliott | H04W 28/08 370/329 |
| 2014/0026169 A1* | 1/2014 | Ye | H04L 47/35 725/62 |
| 2014/0153402 A1* | 6/2014 | Rubin | H04J 11/005 370/238 |
| 2015/0036496 A1* | 2/2015 | Shan | H04W 40/244 370/235 |

FOREIGN PATENT DOCUMENTS

| | | |
|---|---|---|
| EP | 2 086 180 A1 | 8/2009 |
| KR | 10-2006-0070321 A | 6/2006 |
| WO | 2009/058154 A1 | 5/2009 |

OTHER PUBLICATIONS

3rd Generation Partnership Project; Technical Specification Group Services and System Aspects; Data Identification in Access Network Discovery and Selection Function (ANDSF) (DIDA) (Release 11), 3GPP TR 23.855, Dec. 2011, V11.0.0, Sophia-Antipolis, France.

European Office Action dated Jul. 20, 2017, issued in the European Application No. 14 158 898.8.

3rd Generation Partnership Project; Technical Specification Group Services and System Aspects; Feasibility study on user plane congestion management (Release 12), 3GPP TR 22.805 V12.1.0, Dec. 14, 2012.

Chinese Office Action dated Apr. 3, 2018, issued in the Chinese Application No. 201410088163.X.

* cited by examiner

METHOD AND APPARATUS FOR CONTROLLING CONGESTION STATUS OF MOBILE COMMUNICATION NETWORK

CROSS-REFERENCE TO RELATED APPLICATION(S)

This application claims the benefit under 35 U.S.C. § 119(a) of a Korean patent application filed on Mar. 11, 2013 in the Korean Intellectual Property Office and assigned Serial No. 10-2013-0025483, the entire disclosure of which is hereby incorporated by reference.

TECHNICAL FIELD

The present disclosure relates to a method and apparatus for controlling a congestion status of a mobile communication network. More particularly, the present disclosure relates to a method and apparatus for appropriately adjusting a data transmission and/or reception parameter of a user equipment in response to a congestion status occurring in a network.

BACKGROUND

In a mobile communication network, a base station (Radio Access Network (RAN), RAN node, EUTRAN, ENB, or Node B) has to transmit and/or receive data to and/or from a User Equipment (UE) by using limited frequency resources. When the number of users in a cell controlled by an RAN node is increased and/or traffic transmitted and/or received by a UE is increased, a congestion status may occur in the RAN. In order to manage such a RAN congestion status (hereinafter used interchangeably with the term "user plane congestion status") without deteriorating the Quality of Service (QoS) experienced by a user, congestion control taking account of user characteristics and/or service applications is needed. A system component capable of independently performing such a congestion status management operation may include a UE, a communication network, and a server that transmit traffic.

In general, when a server transmits the content requested by a user, traffic transmitted to a UE arrives at the UE over an operator network, if the user or the server is not aware that the operator network's RAN is under congestion, and requests or attempts to transmit more data than the data transmittable over the RAN, then the data cannot be properly transferred to a UE, and the QoS experienced by the user may deteriorate significantly.

As an example of a situation where this problem may arise, consider a case in which a UE receives a video from a content server and plays back the received video. When a data rate of 100 kbps is needed by the video in spite of the fact that only a data rate of 50 kbps may be provided to the UE due to RAN congestion, the video buffer may become empty, leading to frequent pauses of the video. This problem may frequently arise in the wireless mobile communication environment in which videos are played by smart phones, and therefore there is a need for a solution to the problem.

Accordingly, a method and apparatus for controlling a congestion status such that a non-disrupted service may be provided to a User Equipment (UE) when the congestion status occurs in a network is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for controlling a congestion status such that a non-disrupted service may be provided to a User Equipment (UE) when the congestion status occurs in a network.

In accordance with an aspect of the present disclosure, a method of determining a policy by a Policy and Charging Rules Function (PCRF) is provided. The method includes receiving congestion status information of a network from a base station, transmitting the congestion status information to a content server, receiving a parameter for adjusting traffic transmission characteristics from the content server, and determining a policy related to traffic transmission based on the parameter.

In accordance with an aspect of the present disclosure, a Policy and Charging Rules Function (PCRF) is provided. The PCRF includes a transceiver configured to transmit and/or receive a signal with one of a base station and a content server, and a controller configured to receive congestion status information of a network from the base station, to transmit the congestion status information to the content server, to receive a parameter for adjusting traffic transmission characteristics from the content server, and to determine a policy related to traffic transmission, based on the parameter.

In accordance with an aspect of the present disclosure, a method of controlling a congestion status of a network by a content server that provides a content to a User Equipment (UE) is provided. The method includes receiving congestion status information from a Policy and Charging Rules Function (PCRF), storing the congestion status information, upon receiving a service request from the UE, determining a parameter for adjusting traffic transmission characteristics, based on the congestion status information, and transmitting the determined parameter to the PCRF.

In accordance with an aspect of the present disclosure, a content server that provides content to a User Equipment (UE) is provided the content server includes a transceiver configured to transmit and/or receive a signal with one of the UE and a Policy and Charging Rules Function (PCRF), and a controller configured to receive congestion status information of a network from the PCRF, to store the congestion status information, to determine a parameter for adjusting traffic transmission characteristics based on the congestion status information, when receiving a service request from the UE, and to transmit the determined parameter to the PCRF.

In accordance with an aspect of the present disclosure, a method of determining a transmission priority of an application by a User Equipment (UE) is provided. The method includes receiving a policy related to traffic transmission of the UE from an operator network server, storing the policy, determining, when application traffic is generated, whether an application corresponding to the generated application traffic is included in the policy, and determining, when the application corresponding to the generated application traffic is included in the policy, a transmission priority of the application corresponding to the generated application traffic. The policy includes an application identifier, and the determining of whether the application corresponding to the generated application traffic is included in the policy is performed by matching the application to the application identifier.

In accordance with an aspect of the present disclosure, a User Equipment (UE) that executes an application is provided. The UE includes a transceiver configured to transmit and/or receive a signal with one of a base station and an operator network server, and a controller configured to receive a policy related to traffic transmission of the UE from the operator network server, to store the policy, to determine whether an application corresponding to application traffic is included in the policy when the application traffic is generated, and to determine a transmission priority of the application corresponding to the generated application traffic when the application corresponding to the generated application traffic is included in the policy. The policy includes an application identifier, and the controller determines whether the application corresponding to the generated application traffic is included in the policy by matching the application to the application identifier.

In accordance with an aspect of the present disclosure, a method of controlling a congestion status of a network by a base station is provided. The method includes receiving information on a transmission priority of an application from a User Equipment (UE), the application corresponding to application traffic generated in the UE and corresponding to an application identifier included in a policy related to traffic transmission of the UE, storing the transmission priority, and performing differentiated data transmission based on the transmission priority.

In accordance with an aspect of the present disclosure, a base station that controls a congestion status of a network is provided. The base station includes a transceiver configured to transmit and/or receive a signal with a User Equipment (UE), and a controller configured to receive information on a transmission priority of an application from the UE, the application corresponding to application traffic generated in the UE and corresponding to an application identifier included in a policy related to traffic transmission of the UE, to store the transmission priority, and to perform differentiated data transmission based on the transmission priority.

In the method and apparatus for controlling a congestion status of a mobile communication network according to the present disclosure, a UE that is provided with a content or a server that provides a content adjusts transmission characteristics in response to the congestion status, and thereby the quality of service experienced by a user may be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, although the following description of various embodiments of the present disclosure will be directed to a wireless communication system based on Orthogonal Frequency Division Multiplexing (OFDM), especially the 3GPP Evolved Universal Terrestrial Radio Access (3GPP EUTRA) standard, it may be understood by those skilled in the art that the main gist of the present disclosure may also be applied to any other communication system having the similar technical background and channel format, with a slight modification, without substantially departing from the scope of the present disclosure.

For example, the present technology directed to the Long Term Evolution (LTE) system may also be applied to the UTRAN/GERAN system having the similar system architecture. With regard to this, ENB (RAN node) may be replaced by RNC/BSC, S-GW may be omitted and/or incorporated in SGSN, and P-GW may correspond to GGSN. Further, the concept of a bearer in the LTE system may correspond to a PDP context in the UTRAN/GERAN system. Also, AF may correspond to any service providing server or content providing server. In addition, the term "network" as used herein refers to a configuration including a Radio Access Network (RAN) and a Core Network (CN).

Figure 1:
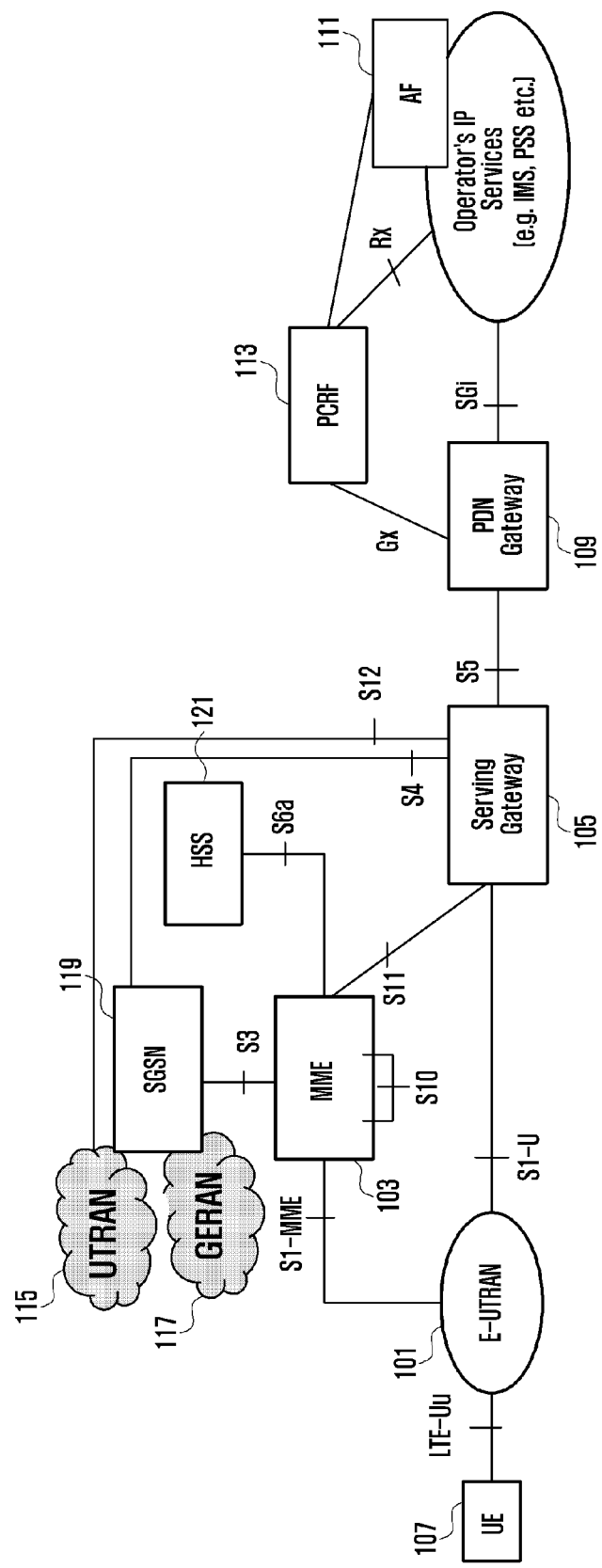
FIG. 1 is a diagram illustrating a configuration of a Long Term Evolution (LTE) mobile communication system according to an embodiment of the present disclosure.

FIG. 1 illustrates a configuration of an LTE mobile communication system according to an embodiment of the present disclosure.

Referring to FIG. 1, the Radio Access Network (RAN) of the LTE mobile communication system 100 includes an Evolved Node B (E-UTRAN, ENB, or Node B) 101, a Mobility Management Entity (MME) 103, and a Serving Gateway (S-GW) 105. A User Equipment (UE) 107 accesses an external network through the ENB 101, the S-GW 105, and a PDN Gateway (P-GW) 109. An Application Function (AF) 111 is a device that is responsible for the actual service application, and exchanges application-related information with a user in the application level. The AF 111 may be operated as a content server that transmits information, in particular, content data to the UE 107. A Policy and Charging Rules Function (PCRF) 113 is a device that controls a policy related to the Quality of Service (QoS) of a user, and a Policy and Charging Control (PCC) rule corresponding to the policy is transferred and applied to the P-GW 109.

The ENB 101 is an RAN node, and corresponds to a Radio Network Controller (RNC) of the UTRAN system 115 and/or a Base Station Controller (BSC) of the GERAN system 117. The ENB 101 is connected to the UE over a wireless channel, and performs a similar role to the existing RNC/BSC. Also, the ENB 101 may use several cells at the same time.

In the LTE system, since all user traffic including a real time service such as a Voice over IP (VoIP) through an Internet Protocol (IP) are serviced through a shared channel, an apparatus for collecting and scheduling status information of UEs is needed, and the ENB 101 serves as this apparatus.

The S-GW 105 is a device that provides a data bearer, and generates or removes a data bearer under the control of the MME 103. The S-GW 105 performs similar functions to those of the serving GPRS Support Node (SGSN) 119 in the 3G Network (GERAN) 117.

The MME 103 is a device that is responsible for various control functions, and one MME 103 may be connected to a plurality of ENBs 101. The MME 103 is also connected to the S-GW 105, the P-GW 109, and a Home Subscriber Server (HSS) 121. The PCRF is an entity that generally controls QoS and charging for traffic.

In general, a User Plane (UP) refers to a path connecting the UE 107 to the RAN node 101, the RAN node 101 to the S-GW 105, and the S-GW 105 to the P-GW 109, through which user data is transmitted and/or received. Of this path, it is the section between the UE 107 and the RAN node 101 that uses a wireless channel with seriously limited resources In a wireless communication system such as LTE, QoS may be applied in units of EPS bearers. One EPS bearer is used to transport IP flows having the same QoS requirements. Each EPS bearer may be associated with a set of QoS-related parameters (QoS parameters), and the QoS parameters include QoS Class Identifier (QCI) and Allocation and Retention Priority (ARP). The EPS bearer is based on a PDP context in the GPRS system.

Conventionally, when a RAN congestion status as described above occurs, the ENB 101 manages the congestion status by controlling data transmission to the UE 107. That is, a method of delaying traffic transmission to the UE 107, a differentiated scheduling method, and the like are used. Accordingly, the UE 107 is inconvenienced by service disruption due to traffic transmission delay, and the like. In particular, when a user is being provided with a service requiring continuous traffic reception, such as video streaming, the ENB's traffic transmission delay due to the congestion status may cause frequent buffering and the like, leading to significant deterioration of QoS.

To solve this problem and effectively manage a congestion status, the present disclosure proposes a method of controlling traffic transmission and/or reception not by a network entity, but by a UE 107 or content server (not illustrated).

Figure 2:
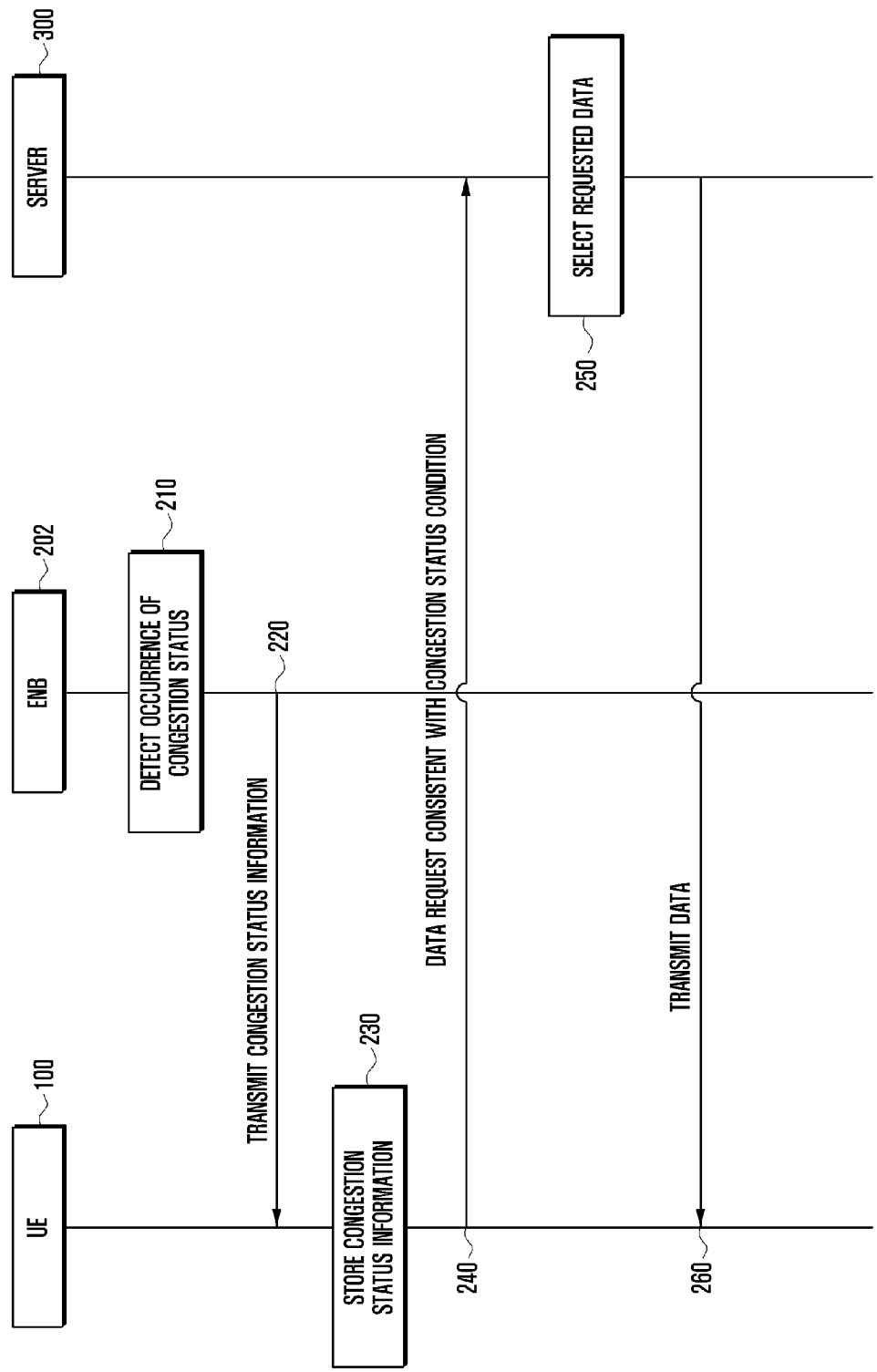
FIG. 2 is a diagram illustrating an operation according to an embodiment of the present disclosure.

FIG. 2 illustrates an operation according to an embodiment of the present disclosure. The embodiment of the present disclosure shown in FIG. 2 describes a method in which a network provides information on a congestion status or a condition for a congestion status to a UE, and the UE adjusts the amount of traffic generated in an uplink and/or downlink, based on the provided information and/or condition.

More specially, an ENB (RAN node) may provide a UE with direct information on a data rate (generally expressed in bits per second) at which the UE may transmit data (or a data rate allowed to the UE) or bases for the determination of the data rate. Upon receiving the information or bases, the UE may adjust the data rate of data to be transmitted in an uplink. Further, when the UE requests a server for data to be transmitted in a downlink, it may prevent the downlink data transmission from exceeding a data rate and/or request the server to transmit data, the size and format of which do not exceed the data rate.

Referring to FIG. 2, the ENB 202 may detect the occurrence of a congestion status in operation 210, and transmits congestion status information to the UE 100 in operation 220.

A method of transmitting the congestion status information to the UE 100 by the ENB 202 includes a method of broadcasting the congestion status information to all or multiple UEs in a cell, rather than a specific UE 100, at regular periods by using an System Information Block (SIB), a method of transmitting the congestion status information to a specific UE 100 by using RRC signaling or by using an MAC CE or PDCP header and an Explicit Congestion Notification (ECN), and the like.

The congestion status information transmitted to the UE 100 may include at least one of 1) a data rate allowed to each UE 100 in the congestion status, 2) an index indicating one of congestion profiles representing predetermined states of congestion, 3) an identifier simply indicating the existence of congestion, 4) a value representing the relative severity of congestion, and 5) application or service identifiers related to the congestion status and a transmission parameter for each identifier or whether the service for each identifier is allowed.

As an example, when the UE 100 desires to be provided with a content and play the provided content, congestion profiles may be predetermined based on bit rates allowed based on the levels of congestion such that index 0 indicates that only an SD content with a low bit rate may be played in the UE 100, index 1 indicates that a content with a medium bit rate may be played in the UE 100, and index 2 indicates that an HD content with a high bit rate may also be played in the UE 100.

The congestion status information may be transferred to the UE 100 without distinguishing between an uplink and a downlink, but it is also possible to separately transfer the congestion status information for each of an uplink and a downlink. Further, when the ENB 202 broadcasts the congestion status information, only information on the existence of congestion or the level of congestion may be included in the congestion status information, and when the congestion status information is carried by a signal transmitted to a specific UE 100, all the above-mentioned information may be included in the congestion status information.

In order to determine the congestion status information, the ENB 202 may consider not only the congestion state, but also the subscription information of the UE 100 and all traffic characteristics related to the UE 100. The MME may provide the ENB 202 with traffic characteristics or QoS information, as well as the subscription information of a user, such as the membership level of a user. For example, the subscription information of a user may include the QoS class that may be provided to the user, and the ENB 202 may reflect this information in the generation of the congestion status information such that a UE with a lower QoS class has a more limited data rate than a UE with a higher QoS class.

Upon receiving the congestion status information, in step operation 230, the UE 100 may store the congestion status information, and then performs an operation for managing the congestion status, based on the stored congestion status information. This operation is performed in order to prevent the QoS experienced by a user from being deteriorated by transmitting and/or receiving data requiring a data rate higher than the data rate that the RAN may provide in the congestion status.

As an example, the UE 100 may determine a congestion status condition including a transmission parameter including content size, content quality (SD or HD), and/or maximum data rate by making reference to the details of the congestion profile predetermined according to the index received from the network. Upon determining the congestion status condition, in operation 240, the UE 100 may only request the content server 300 for data transmission consistent with the determined congestion condition. In operation 250, the content server 300 may select data to be transmitted at the request of the UE 100, and in operation 260, data transmission and/or reception is performed between the content server 300 and the UE 100.

Instead of directly determining the congestion status condition, the UE 100 may transmit the congestion status information to the content server 300, and request that the content server 300 determine a congestion status condition including transmission parameter adjustment. An example of determining the congestion status condition by the content server 300 will be described below.

The operation of the UE 100 as described in FIG. 2 may be performed in response to a content request occurring after the UE 100 receives the congestion status information from the ENB 202. As an example, when a user selects the playing of HD video content through the user interface of the UE 100. A content request is made from a content playback application, the UE 100 may change the quality of the requested content to the SD level pursuant to the congestion status condition determined based on the congestion status information, and request the content server 300 provide the content with the changed quality.

In such a case, the UE 100 may display a message on the screen, which informs a user that the transmission parameter of the content selected by the user may be different from that requested to the content server 300. Alternatively, the UE 100 may display a message on the screen, which asks a user whether to accept the action to change the transmission parameter.

Alternatively, the UE 100 may block transmission of traffic that does not satisfy the given transmission parameter or block a transmission request. As an example, the UE 100 may deactivate the selection button for HD video content playback in the user interface, and thereby make it impossible for a user to select an HD video content.

Figure 3:
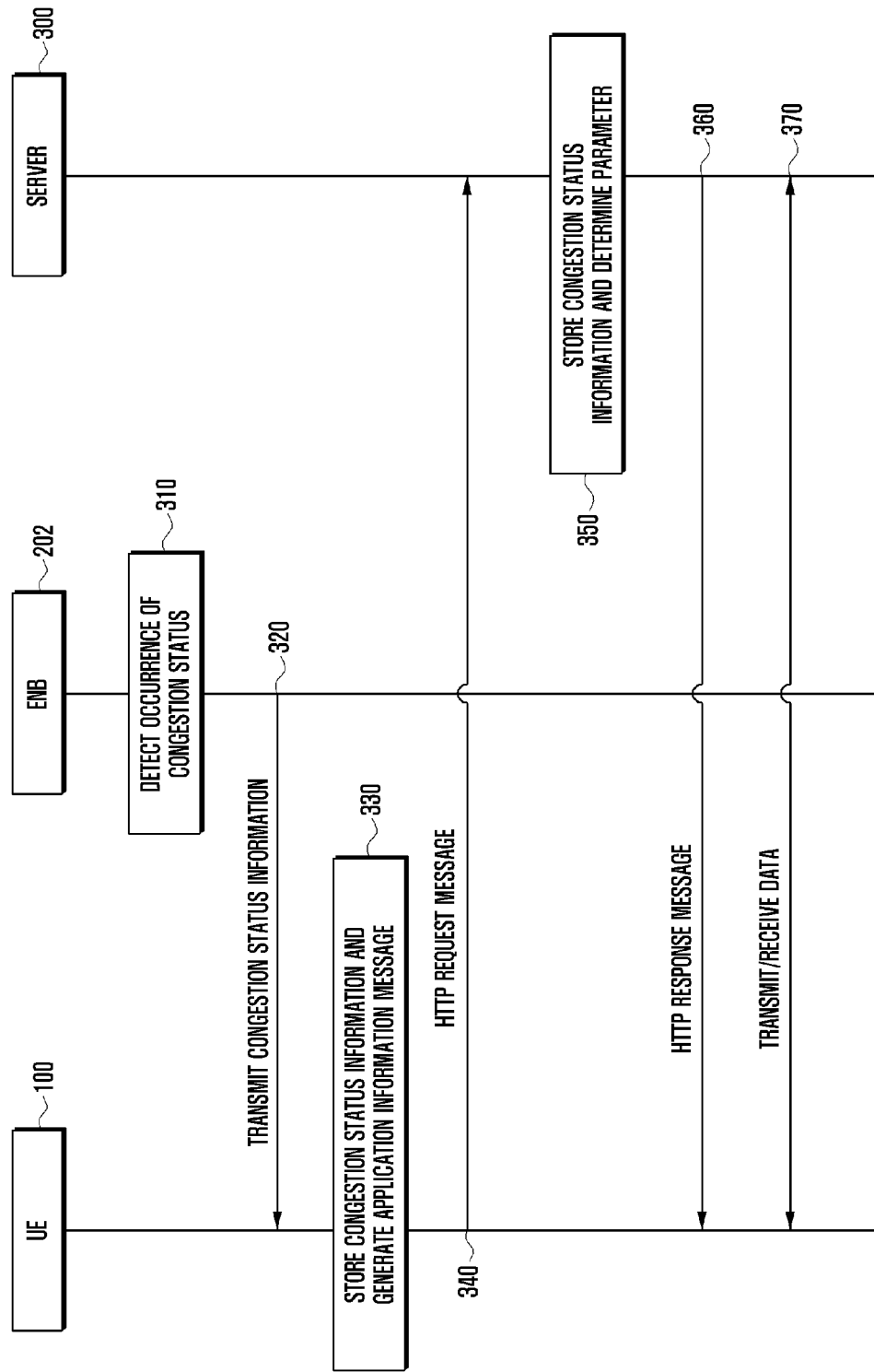
FIG. 3 illustrates a case where a content server determines a transmission parameter according to an embodiment of the present disclosure.

FIG. 3 illustrates a case where the content server 300 determines a transmission parameter according to an embodiment of the present disclosure.

Referring to FIG. 3, the ENB 202 may detect the occurrence of a congestion status in operation 310, and transmit congestion status information to the UE 100 in operation 320. In operation 330, the UE 100 may store the congestion status information, and then generate an application information message for a content request to the content server 300.

With regard to this, although the UE 100 may determine a congestion status condition including a transmission parameter, based on the congestion status information, and make a service request to the content server 300, as shown in FIG. 2. The service request may also carry the congestion status information by a service request transmitted to the content server 300, thereby requesting the content server 300 to determine a congestion status condition, as shown in operation 340 of FIG. 3. As an example, such a request may be transmitted using an HTTP request message format. The format of the request message transmitted from the UE 100 to the content server 300 is not limited to the HTTP request, and other message formats may be used or a new message format may be defined.

Upon receiving the congestion status information from the UE 100 through the request message such as the HTTP request message, in operation 350, the content server 300 stores the congestion status information transmitted by the UE 100, and determines a congestion status condition including a transmission parameter to be used for the actual traffic transmission, based on the stored congestion status information. Subsequently, the content server 300 informs the UE 100 of the determined congestion status condition including the transmission parameter through a response message such as a message using an HTTP response format in operation 360, and then transmits and/or receives data to and/or from the UE 100 in operation 370.

Just as the ENB 202 considers the subscription information and the like of the UE 100 in the process of generating the congestion status information, the content server 300 may consider user subscription information such as a subscriber priority (level) or admitted QoS parameters in determining the congestion status condition. The content server 300 may receive the subscriber priority (level) of a user and/or the admitted QoS parameters from the PCRF through the Rx connection.

In addition, the UE 100 may also receive congestion control information including the congestion status information, the congestion status condition, and the like from a network entity other than the ENB 202.

Figure 4:
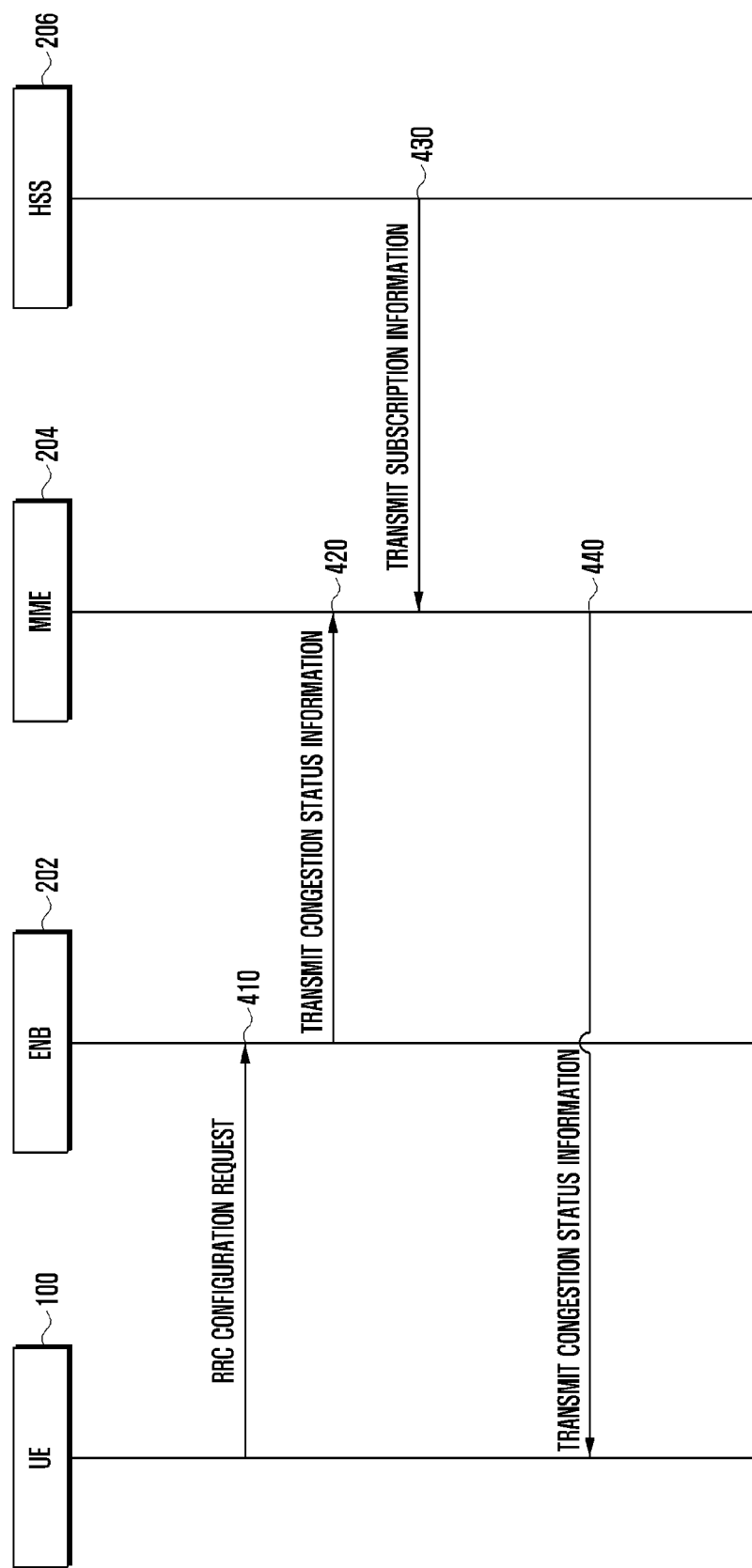
FIG. 4 illustrates a case where a User Equipment (UE) receives congestion control information from a Mobility Management Entity (MME) according to an embodiment of the present disclosure.

FIG. 4 illustrates a case where the UE 100 receives congestion control information from the MME 204 according to an embodiment of the present disclosure.

Referring to FIG. 4, if the UE 100 may transmit an initial configuration message such as a service request (RRC configuration) to the ENB 202 in operation 410, then the ENB 202 may inform the MME 204 of a congestion status when transferring the initial configuration message 'r' by using separate signaling in operation 420. Alternatively, when the ENB 202 detects a congestion status and/or a congestion status is over and/or changed. The ENB 202 may inform the MME 204 of this, regardless of the request of the UE 100.

The MME 204 may determine congestion control information to be transferred to the UE 100, based on the subscription information of the UE 100, received from the HSS 206 in operations 430 and 440, and congestion status information received from the ENB 202. The congestion control information may include at least one of congestion status information and a congestion status condition. The types, formats, meanings of the congestion status information and the congestion status condition, and the operations that the UE 100 performs upon receiving them are the same as the above case, so a detailed description thereof will be omitted here.

When the UE 100 may receive the congestion status information and determines the congestion status condition and/or transmits a request message for the congestion status condition to the content server 300, the congestion status information received by the UE 100 may be transferred to an upper layer, that is, an application that generates a request for data transmission/reception with the content server 300, in the UE 100, and may be used to determine a transmission parameter.

Figure 5:
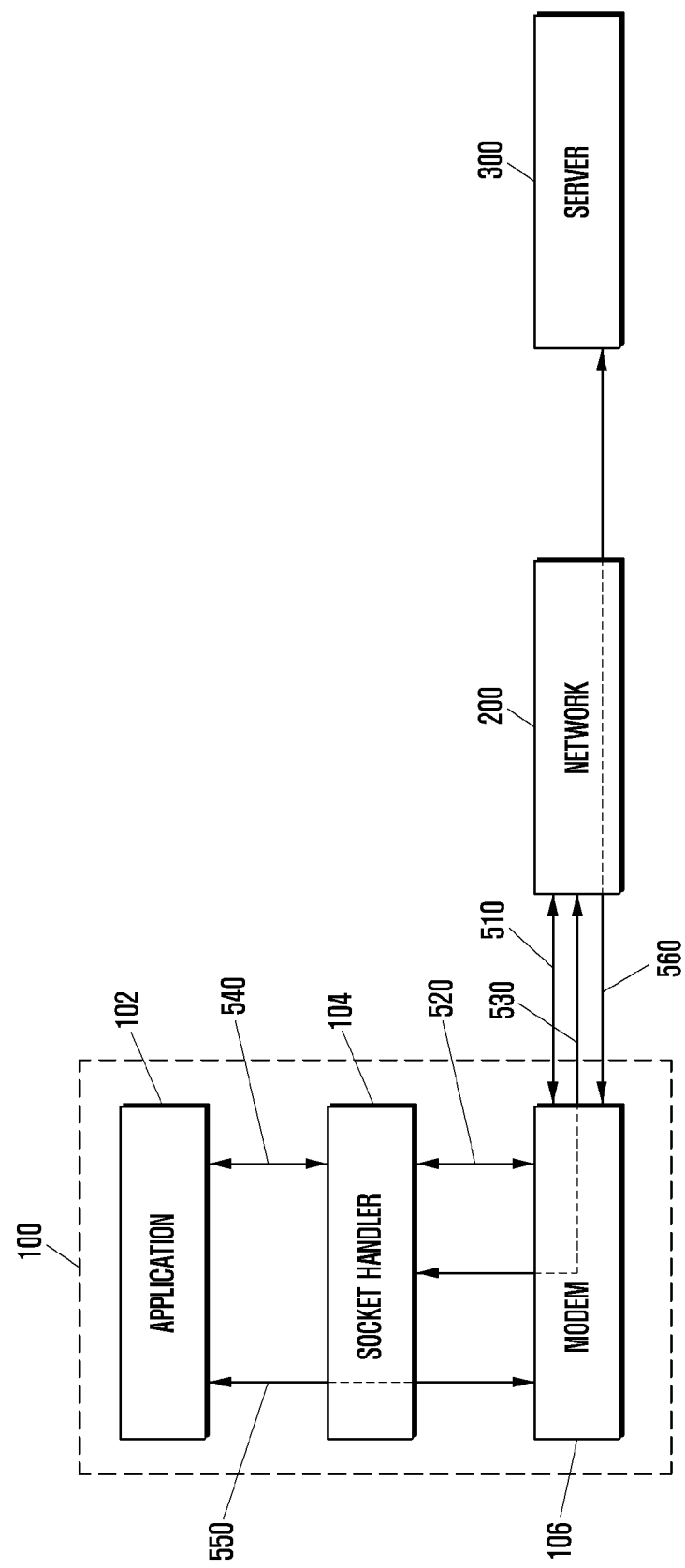
FIG. 5 illustrates a case where an application in a UE performs an operation to manage a congestion status according to an embodiment of the present disclosure.

FIG. 5 illustrates a case where an application in the UE 100 performs an operation to manage a congestion status according to an embodiment of the present disclosure.

Referring to FIG. 5, an application 102 in the UE 100 may generate a socket for data transmission and/or reception with the content server 300, and subsequently, if congestion-related information is detected by the socket manager 104 (hereinafter defined as "socket handler") responsible for the management of the socket during data transmission and/or reception, the socket handler 104 may transfer the congestion status information to the application 102, and the application 102 may correspondingly adjust a traffic transmission parameter to transmit data by using the adjusted traffic transmission parameter and/or inform the content server 300 of the adjusted traffic transmission parameter.

More specifically, if an application 102 is executed in the UE 100, then the application 102 may make a request to generate a socket for performing data transmission and/or reception. Such a socket may be managed directly by the Operating System (OS) or may be managed by one type of software executed with authority on the OS, and an entity serving to manage the socket corresponds to the socket handler.

When the socket is generated, the application 102 may register a request for notifying the application 102 of the occurrence of an event of receiving congestion status and/or congestion control-related information with the socket handler 104 in advance.

When a congestion status occurs in the process of data transmission and/or reception, the network 200 (RAN node and/or core network node) may provide congestion-related information to the UE 100. If this congestion-related information is provided by an RRC message (generated by the RAN node) or an NAS message (generated by the MME) via path 510, then the modem layer 106 (where the MAC, RLC, PDCP, RRC, and NAS layers are processed) receives and analyzes the congestion-related information, and transfers the corresponding information up to the application 102 by the Application Programming Interface (API) between the socket handler 104 and the modem 106 via paths 520, 540 and 550.

The RAN node in the network 200 may carry congestion status information and/or congestion control information by the IP header or PDCP header of a packet transmitted to the UE 100. With regard to this, the information inserted into the header may include an ECN and/or at least one of a congestion state, a congestion level, a congestion control profile, and a data rate allowed in a congestion status. This information is transferred from the modem layer 106 in the UE 100 to the upper layer via path 530, and upon receiving the information, the socket handler 104 in turn transfers the information to the application 102 having a socket through which a packet passes.

This process in which the socket handler 104 informs the application 102 of congestion-related information may be performed when the application 102 registers a request for notification of a congestion-related information reception event with the socket handler 104 in advance, as described above, and/or may be performed even when the application 102 does not register such a request with the socket handler 104. The application 102 may also provide a congestion status information reception method that may be called by the socket handler 104. Upon receiving the congestion status information through this process, the application 102 may change the characteristics such as transmission parameter of traffic generated by the application 102 and/or a content requested to the content server 300, based on the received congestion status information.

This process may include not only a process in which the UE 100 may transfer the congestion status information received by itself to the content server 300 (echo back), but also a process in which when the UE 100 may receive a congestion profile index from the network 200. The UE 100 may adjust a traffic transmission parameter, for example, content size, content quality (SD or HD), maximum data rate, and/or the like by making reference to the details of the congestion profile based on the received index, and/or request the content server 300 to adjust a transmission parameter.

As described above, the UE 100 may perform the above congestion status management operation for a content request made in the application 102 after receiving the congestion status information from the network 200. As an example, when a user selects to play an HD video content, and a content request corresponding thereto is made, the UE 100 may change the quality of the requested content to the SD level pursuant to the transmission parameter determined based on the congestion status information, and request the content server 300 for the content with the changed quality.

In such a case, the UE 100 may display a message on the screen, which informs a user that the transmission parameter of the content selected by the user may be different from that requested of the content server 300, and/or display a message on the screen, which asks a user whether to accept the action of changing the transmission parameter.

Alternatively, the UE 100 may block transmission of traffic not satisfying the given transmission parameter and/or block a transmission request. As an example, the UE 100 may deactivate the selection button for HD video content playback on the screen, and thereby make it impossible for a user to select an HD video content. Such an operation of the UE 100 may include all the operations described in the above various embodiments, which are performed when the UE 100 receives the congestion status information from the ENB 202 or the MME 204. However, there is a difference in that the operation is performed by the application.

Although the embodiment of the present disclosure described with reference to FIG. 5 has been described based on a socket that is generally used in the current communication device, the main focus of the present disclosure is in a process in which the UE transfers the congestion status information or congestion control information, received from the network system, up to the application through an API, and the application selects a traffic transmission parameter capable of appropriate managing the congestion status, based on the congestion status or control information, and/or requests the content server 300 to select such a traffic transmission parameter.

Further, when the content server 300 determines a transmission parameter based on a congestion status, as described in FIG. 3, the content server 300 may either start a process of renegotiating the transmission parameter of media traffic transmitted and/or received with the UE 100 by changing the transmission parameter settings of the application on the content server 300, which is directly contacted with the application 102 in the UE 100, and/or change the characteristics (screen size, quality, data rate, and the like) of traffic transmitted from the content server 300 to the UE 100 and transmit the changed traffic to the UE 100.

Figure 6:
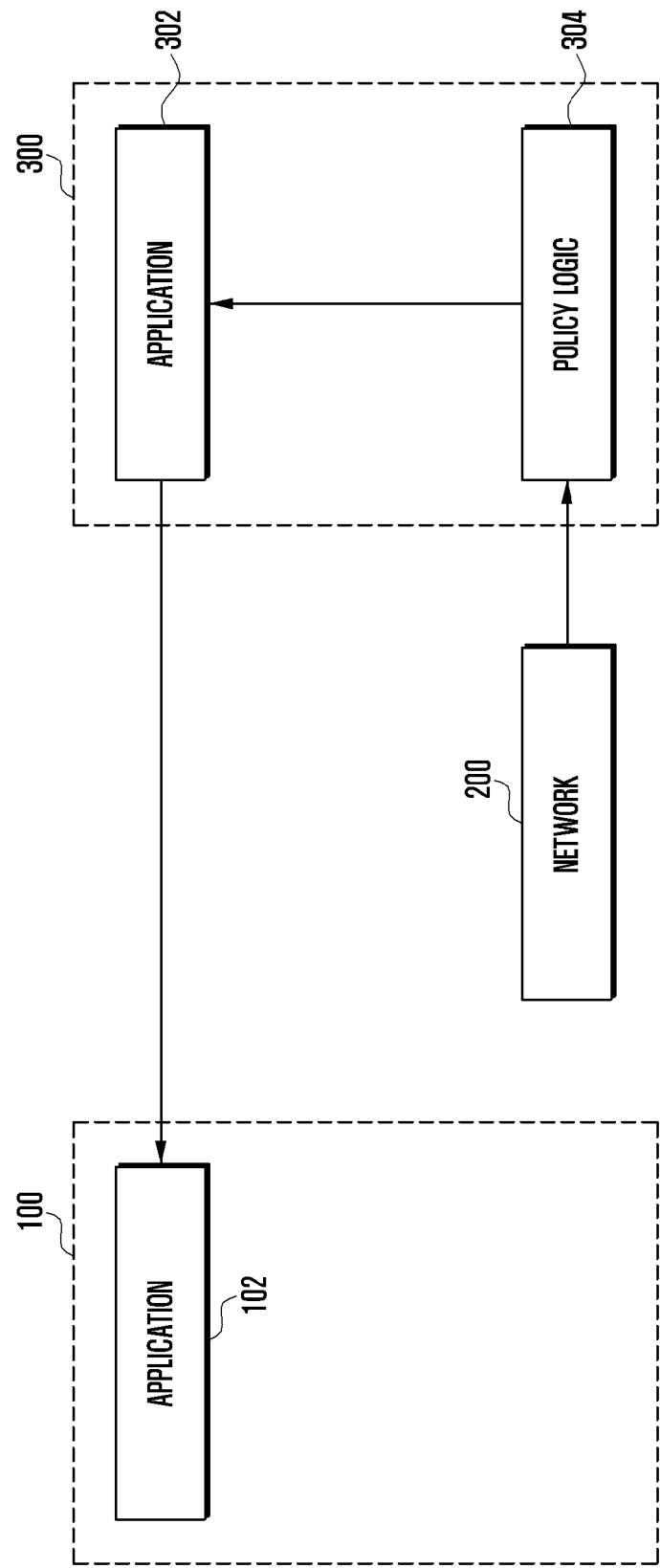
FIG. 6 illustrates a case where an application in a content server performs changing a transmission parameter according to an embodiment of the present disclosure.

FIG. 6 illustrates a case where the application in the content server 300 performs changing a transmission parameter according to an embodiment of the present disclosure.

Referring to FIG. 6, upon receiving congestion status information from the network 200, the policy logic 304 in the content server 300 may either analyze the received information and inform the application 302 in the content server 300 of the analyzed congestion status information, or personally determine a transmission parameter to be used in a transmission and/or reception operation and inform the application 302 of the determined transmission parameter.

Upon receiving the information from the policy logic 304, the application 302 may either start a process of renegotiating the transmission parameter to be used for data transmission and/or reception with the UE 100, and/or change the characteristics (screen size, quality, data rate, and the like) of traffic transmitted from the content server 300 to the UE 100 and transmit the changed traffic to the UE 100 via path 560. In the process of this, the content server 300 may consider user subscription information such as the subscriber priority (level) of a user or admitted QoS parameters.

Figure 7:
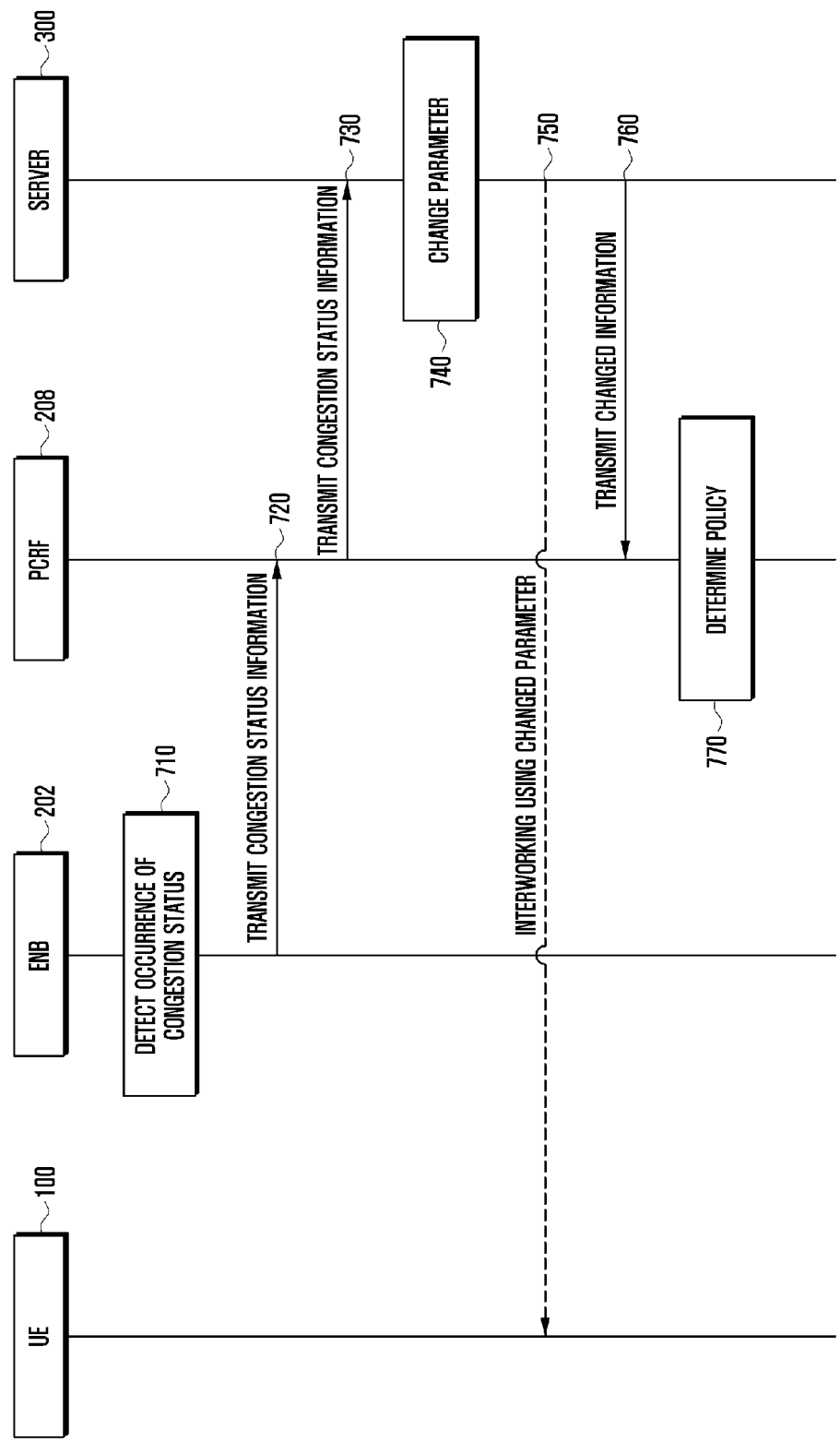
FIG. 7 illustrates an example in which policy logic in a content server receives congestion status information, and an application in the content server determines a transmission parameter according to an embodiment of the present disclosure.

FIG. 7 illustrates an example in which the policy logic 304 in the content server 300 receives congestion status information, and the application 302 in the content server 300 determines a transmission parameter according to an embodiment of the present disclosure.

Referring to FIG. 7, when a congestion status occurs, the ENB 200 may detect the occurrence of the congestion status in operation 710 and inform the PCRF 208 of this in operation 720, and in operation 730, the PCRF 208 may inform the content server 300 that congestion-related information is received, by using the Rx interface.

The PCRF 208 may also inform the content server 300 of the congestion status information only when the content server 300 registers a request for notification of the occurrence of a congestion status event with the PCRF 208 in advance. The congestion status information transferred to the content server 300 by the PCRF 208 may include at least one of the existence or not of congestion, information on the cell where congestion occurs, the ID (list) of a UE, the level of congestion, and a transmission parameter (content size, quality, data rate, etc.) allowed to a corresponding service in the congestion status.

The content server 300 may adjust a traffic transmission parameter, based on the congestion status information, in operation 740, and transfer QoS information (GBR or MBR, bearer QCI, packet filter, etc.) needed for traffic transmission back to the PCRF 208 in operation 760. Accordingly, in operation 770, the PCRF 208 may perform a process for allocating or changing resources needed for traffic transmission by generating or changing a PCC rule.

If data (content) is being currently transmitted to the UE 100, the content server 300 may also perform a process for changing a media transmission parameter (content size, quality, data rate, etc.) directly with the UE 100, as shown in operation 750. In the process described above, the PCRF 208 or the content server 300 may consider user subscription information such as the subscriber priority (level) of a user or admitted QoS parameters.

Figure 8:
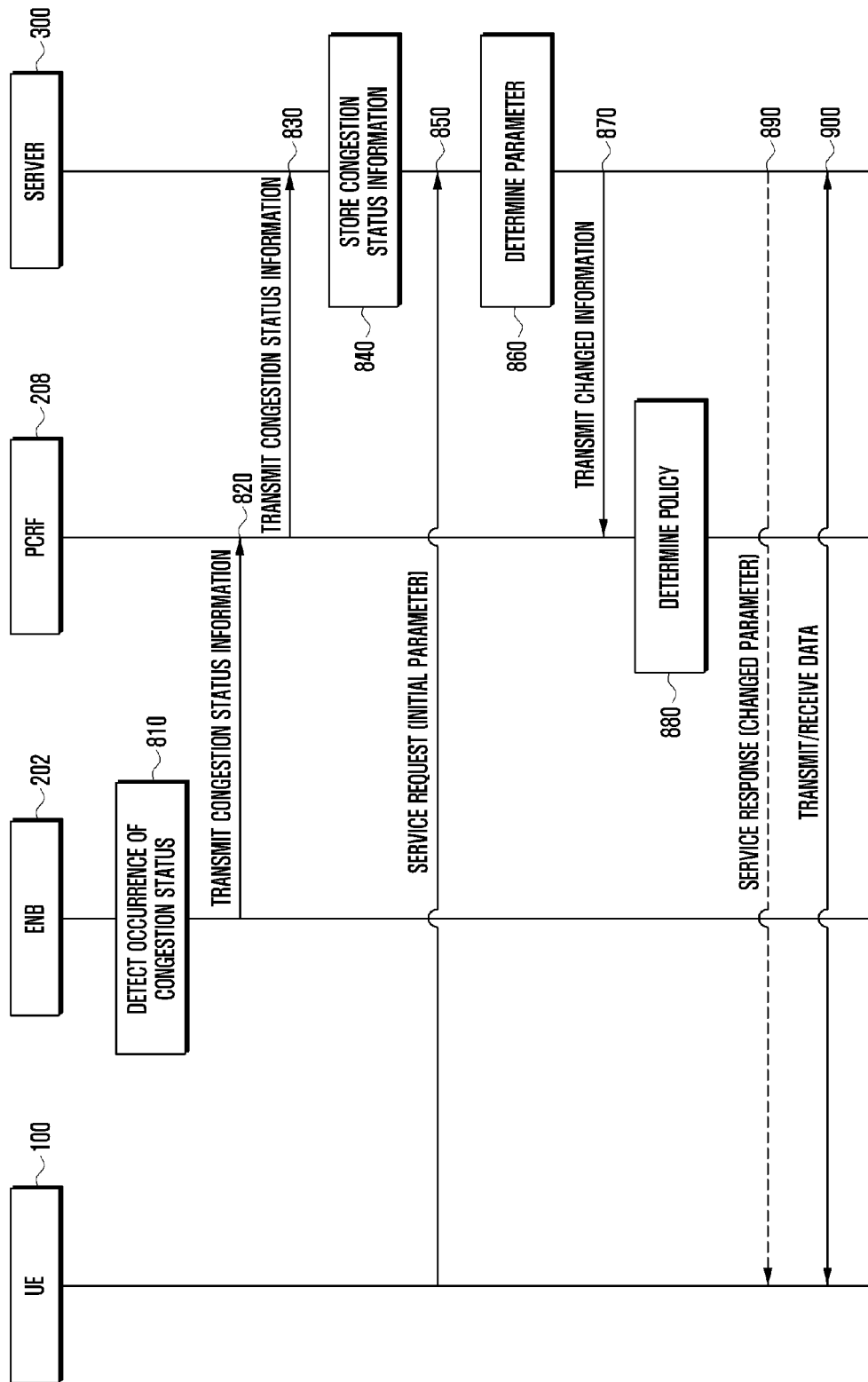
FIG. 8 illustrates an example in which policy logic in a content server receives congestion status information, an application in the content server determines a transmission parameter, and the content server receives a new service request from a UE according to an embodiment of the present disclosure.

FIG. 8 illustrates an example in which the policy logic 304 in the content server 300 receives congestion status information, the application 302 in the content server 300 determines a transmission parameter, and the content server 300 receives a new service request from the UE 100 according to an embodiment of the present disclosure.

Referring to FIG. 8, when the ENB 202 detects the occurrence of a congestion status of the network in operation 810 and transmits congestion status information to the PCRF 208 in operation 820, the PCRF 208 may transfer the congestion status information to the content server 300 in operation 830. The content server 300 may store the congestion status information in operation 840.

In the state where the content server 300 receives the congestion status information through the PCRF 208 and stores the received congestion status information in this way, when the UE 100 transmits a new service request (or content request) to the content server 300 in operation 850, the content server 300 may determine a new media transmission parameter in consideration of at least one of the initial value of the media traffic parameter (content size, content quality, data rate, etc.) requested by the UE 100, the stored congestion status information, and the subscription information of the UE 100 in operation 860, and transmit the changed information to the PCRF 208 in operation 870. In operation 880, the PCRF 208 may determine a policy by using the received information.

In operation 890, the content server 300 may also transfer the determined transmission parameter to the UE 100 by carrying the determined transmission parameter via a service response. When there is no need to transfer the changed transmission parameter to the UE 100, in operation 890, the content server 300 may transmit data (content), selected and generated corresponding to the transmission parameter, to the UE 100 in operation 900.

There are several conditions that may be used when a traffic transmission differentiation scheme is employed in a congestion status. In general, an ENB determines traffic transmission differentiation based on QCI, one of QoS contexts. However, when a plurality of bearers with the same QCI are receiving services, information capable of determining priorities between the bearers and/or between various IP flows transmitted using the bearers is needed.

Currently, some of application traffic transmitted in a mobile communication network is insensitive to transmission delay and/or packet loss during transmission. For example, information that is not recognized and does not need to be promptly determined by a user, such as weather information, and/or the version-up or update information of applications in a UE. Such application traffic may be effectively used for congestion control because the application traffic insensitive to delay does not have to be transmitted preferentially to other application traffic during a congestion period.

In an embodiment of the present disclosure, in order to make use of such information, an operator network's configuration server (OMA-DM server or ANDSF server) may transfer mapping information between application identifiers and application priorities (attended and/or unattended status) corresponding thereto as configuration information (or policy) to a UE, the UE may classify currently executed applications based on the mapping information and inform an ENB of their priorities or attended and/or unattended status, and the ENB may apply them to congestion control in a congestion status.

Figure 9:
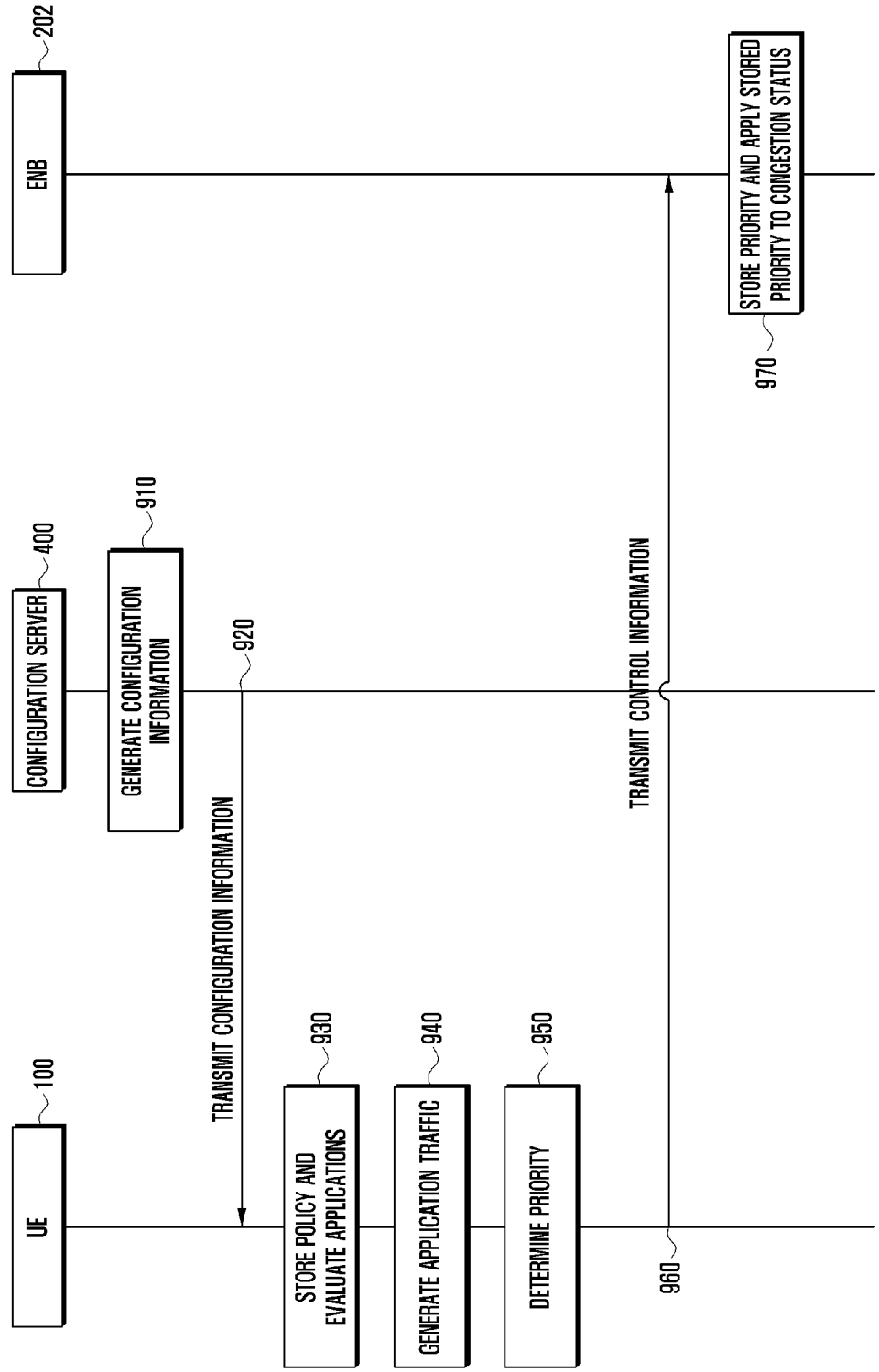
FIG. 9 illustrates an example in which application priorities set by an operator network are applied to congestion control according to an embodiment of the present disclosure.

FIG. 9 illustrates an example in which application priorities set by an operator network are applied to congestion control according to an embodiment of the present disclosure.

Referring to FIG. 9, the configuration server 400 of the operator network generates a policy or configuration information to be transmitted to the UE 100 in operation 910, including application identifiers, application priorities, application attended and/or unattended status, and a condition for using them, in operation 920, and transfers the generated configuration information to the UE 100.

Upon receiving the configuration information, in operation 930, the UE 100 may store the configuration information, and evaluates and classifies currently executed applications. Subsequently, when application traffic is generated in operation 940, in operation 950, the UE 100 may determine if there is an application matched to the application identifier included in the configuration information, among applications corresponding to the generated traffic, and when there is a matched application, determines the transmission priority and/or attended and/or unattended status corresponding to the application identifier.

Whether to perform such an operation may be determined based on the use condition predetermined in the policy and/or configuration information. The use condition may include a condition indicating that the operation is performed only when congestion status information is received from an RAN node or a congestion level informed by an RAN node is a certain level or higher, a time condition, a location information, or the like. Accordingly, if the use condition is satisfied and the application matched to the received application identifier is being executed, the UE may inform the network of the priority and/or attended and/or unattended status of the application in operation 960. This means, UE may generate a control signaling message and send the message to the network for this purpose. As operation 960 is performed between the UE and the eNB, the control signaling message can be the one of RRC messages.

It is also possible to combine two examples in which application priorities are set for controlling uplink traffic transmission under the RAN congestion. As proposed in the example associated to FIG. 9, the configuration server of the operator network generates a policy or configuration information to be transmitted to the UE, including application identifiers, application priorities, application attended and/or unattended status, indication whether the application is being blocked or not, and a congestion condition for using them, and transfers the generated configuration information to the UE. Upon receiving the configuration information, the UE may store the configuration information, and evaluates and classifies currently executed applications.

On the other hand, as described in the example associated to FIG. 2, the ENB may detect the occurrence of a congestion status and transmits congestion status information to the UE. A method of transmitting the congestion status information to the UE by the ENB includes a method of broadcasting the congestion status information to all or multiple UEs in a cell, rather than a specific UE, at regular periods by using an System Information Block (SIB), a method of transmitting the congestion status information to a specific UE by using RRC signaling or by using an MAC CE or PDCP header and an Explicit Congestion Notification (ECN), and the like.

The congestion status information transmitted to the UE 100 may include at least one of 1) a data rate allowed to each UE 100 in the congestion status, 2) an index indicating one of congestion profiles representing predetermined states of congestion, 3) an identifier simply indicating the existence of congestion, 4) a value representing the relative severity of congestion, and 5) application or service identifiers related to the congestion status and a transmission parameter for each identifier or whether the service for each identifier is allowed. For example of 5), the eNB may provide the UE with the information for allowing the UE to decide whether the transmission of uplink traffic or the request for the uplink grant for specific application or service identifiers is allowed or not.

The congestion status information may be transferred to the UE without distinguishing between an uplink and a downlink, but it is also possible to separately transfer the congestion status information for each of an uplink and a downlink. Further, when the ENB broadcasts the congestion status information, only information on the existence of congestion, the level of congestion, or the blocking status (i.e., whether the transmission/request for uplink traffic is blocked or not) of specific application or service identifiers may be included in the congestion status information, and when the congestion status information is carried by a signal transmitted to a specific UE, all the above-mentioned information may be included in the congestion status information.

In order to determine the congestion status information, the ENB may consider not only the congestion state, but also the subscription information of the UE and all traffic characteristics related to the UE. The MME may provide the ENB with traffic characteristics or QoS information, as well as the subscription information of a user, such as the membership level of a user. For example, the subscription information of a user may include the QoS class that maybe provided to the user, and the ENB may reflect this information in the generation of the congestion status information such that a UE with a lower QoS class has a more limited data rate than a UE with a higher QoS class.

Upon receiving the congestion status information, the UE may store the congestion status information, and then performs an operation for managing the congestion status, based on the stored congestion status information received from the eNB and the configuration information received from the configuration/policy server. That is, when application traffic is generated, the UE may determine if there is an application matched to the application identifier included in the configuration information, among applications corresponding to the generated traffic, and when there is a matched application, determines the traffic blocking status and/or attended and/or unattended status corresponding to the application identifier. If the received congestion status information indicates that the transmission or request for unattended traffic is blocked, and the generated application traffic is subject to being blocked and is identified as unattended according to the configuration, the UE blocks the generated uplink traffic or the associated uplink grant request.

When a plurality of applications are being executed, the information transferred to the network may be information on all the respective applications and/or a combination of information on the respective applications, for example, information on the application that has the highest priority among the currently executed applications or attended information indicating that the statuses of one or more applications are classified as attended.

Upon receiving this information, in operation 970, the network ENB 202 may store the priority information and subsequently use it for differentiated transmission in a congestion status. As an example, for traffic with the same subscription priority and bearer QCI, it is possible to apply transmission (scheduling) differentiation according to application priorities or delay transmission (scheduling) of traffic classified as unattended.

Figure 10:
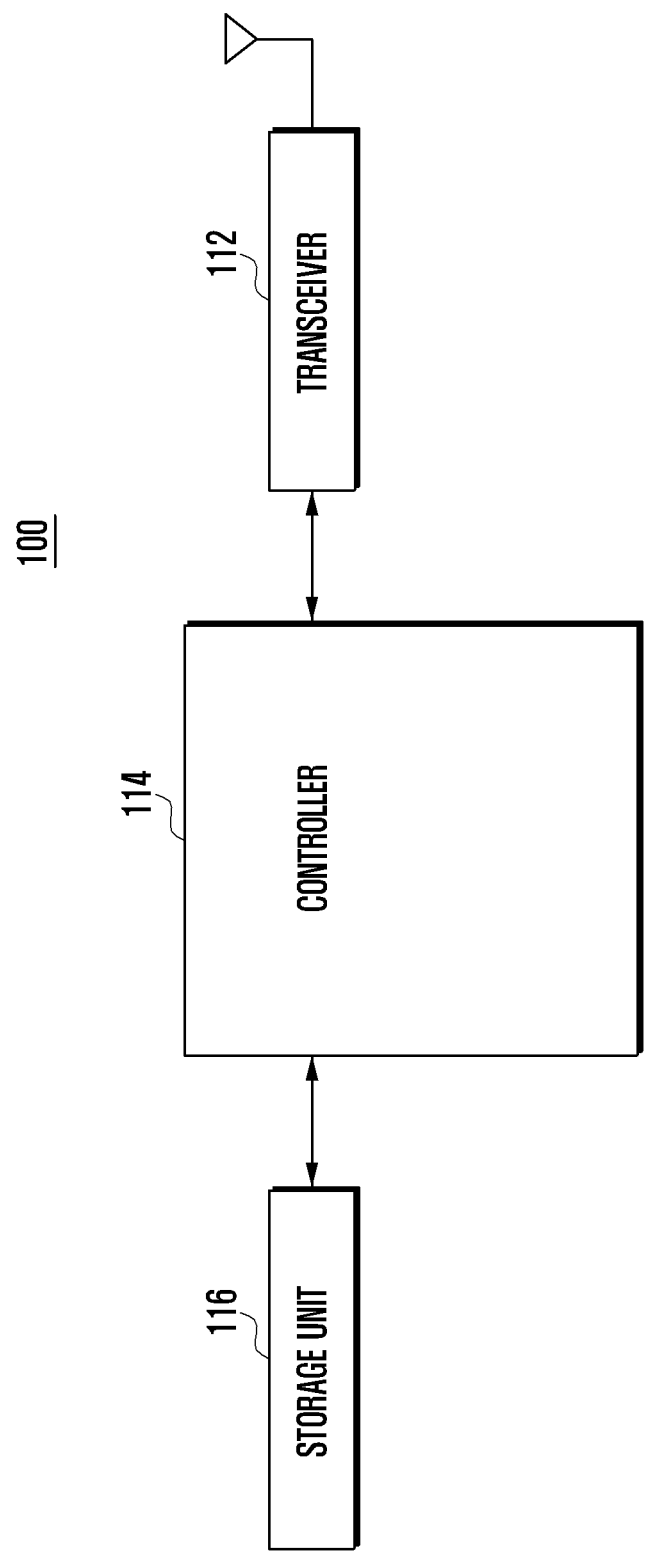
FIG. 10 is a block diagram illustrating a configuration of a UE according to an embodiment of the present disclosure.

FIG. 10 illustrates a configuration of the UE 100 according to an embodiment of the present disclosure.

Referring to FIG. 10, the UE 100 may include a transceiver 112, a controller 114, and a storage unit 116.

The transceiver 112 may transmit and/or receive a signal with the network, receive a signal including congestion status information, a congestion status condition, and the like from the network, and transmit a signal such as a content request, under the control of the controller 114.

The controller 114 may control the congestion status management operation of the UE 100 described above. More specially, upon receiving congestion status information, the controller 114 may correspondingly determine a congestion status condition including a transmission parameter for data transmission and/or reception with the content server 300, or may also transmit a content request message including the congestion status information to the content server, thereby requesting the content server to determine a transmission parameter. Further, the controller 114 may transfer the congestion status information to the upper layer, that is, the socket handler 104 and the application 102, and thereby allow the application 102 to perform the congestion management operation.

The storage unit 116 may store congestion status information and a congestion status condition received from the network, and may store configuration information received from the configuration server 400 of the operator network, as shown in FIG. 9.

Figure 11:
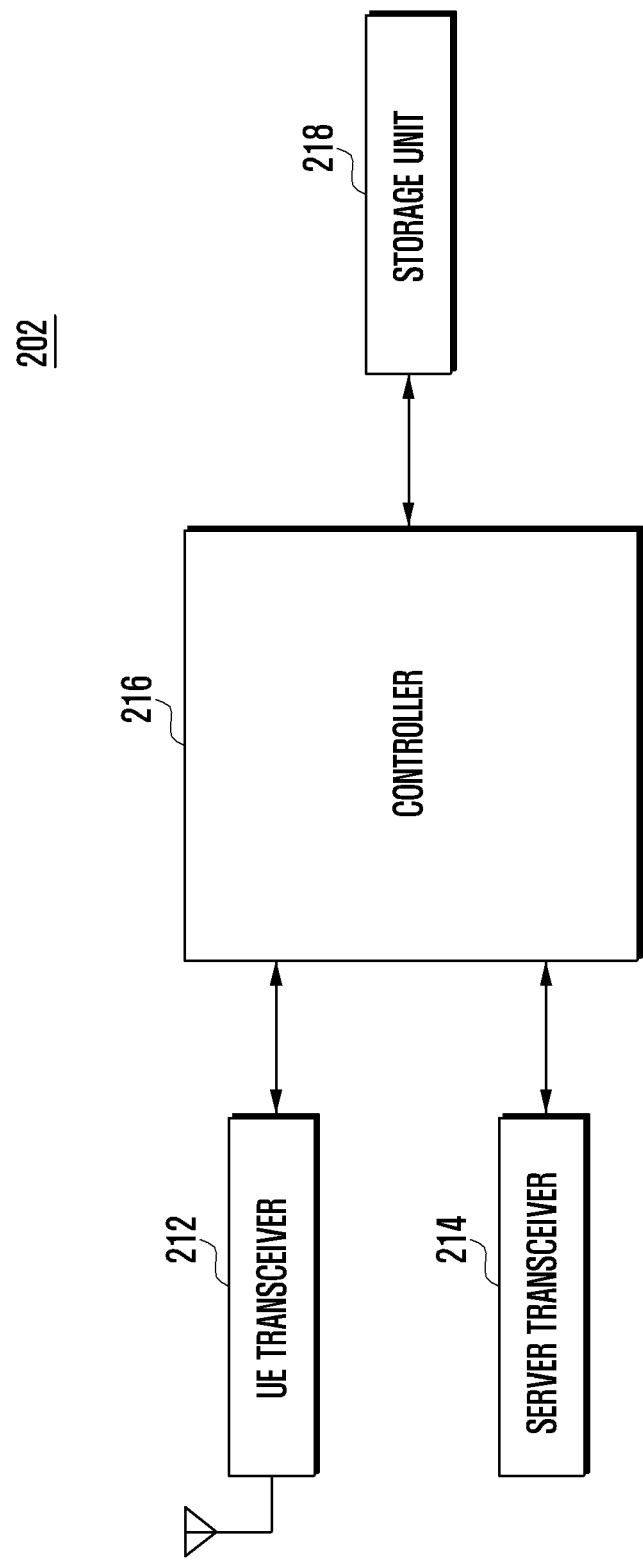
FIG. 11 is a block diagram illustrating a configuration of an ENB according to an embodiment of the present disclosure.

FIG. 11 illustrates a configuration of the ENB 202 according to an embodiment of the present disclosure.

Referring to FIG. 11, the ENB 202 may include a UE transceiver 212, a server transceiver 214, a controller 216, and a storage unit 218.

The UE transceiver 212 and the server transceiver 214 transmit and/or receive a signal with the UE 100 and another network node respectively, and transfer various pieces of information including congestion status information and a congestion status condition to the UE 100 and/or another network node.

Upon detecting a congestion status of the network, the controller 216 may correspondingly generate congestion status information, and control the transceivers 212, 214 to transmit the generated congestion status information to the UE 100 or another network node. In addition, the controller 216 may store application priorities received from the UE 100, and use the stored application priorities for differentiated traffic transmission in a congestion status.

The storage unit 218 may store various pieces of information related to a congestion status, including congestion status information, the priority information of applications executed in the UE 100, and the like.

Figure 12:
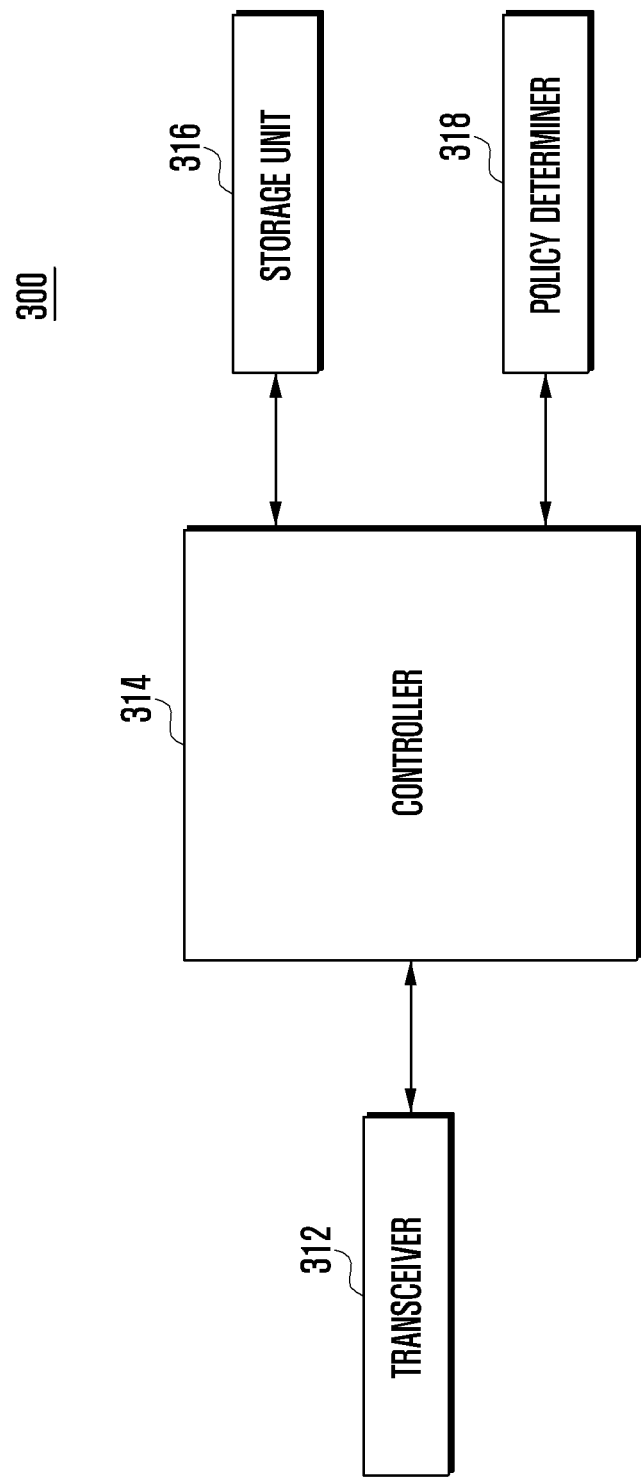
FIG. 12 is a block diagram illustrating a configuration of a content server according to an embodiment of the present disclosure.

FIG. 12 illustrates a configuration of the content server 300 according to an embodiment of the present disclosure.

Referring to FIG. 12, the content server 300 may include a transceiver 312, a controller 314, a storage unit 316, and a policy determiner 318.

The transceiver 312 may transmit and/or receive a signal with the network, and the transmitted and/or received signal may include congestion status information, a congestion status condition, a content request, and other information.

Upon receiving a congestion status condition from the UE 100, the controller 314 may determine the transmission characteristics of data to be transmitted to the UE, based on a transmission parameter included in the congestion status condition, and upon receiving congestion status information from the UE 100, determine a congestion status condition such as a transmission parameter for data transmission and/or reception with the UE 100, based on the corresponding congestion status information. The storage unit 316 may store the congestion status information and the congestion status condition.

Upon receiving congestion status information from the PCRF 208 in the network, the policy determiner 318 may transfer the information to the application 302 in the content server 300, and thereby allows the application 302 to perform the congestion status management operation.

Figure 13:
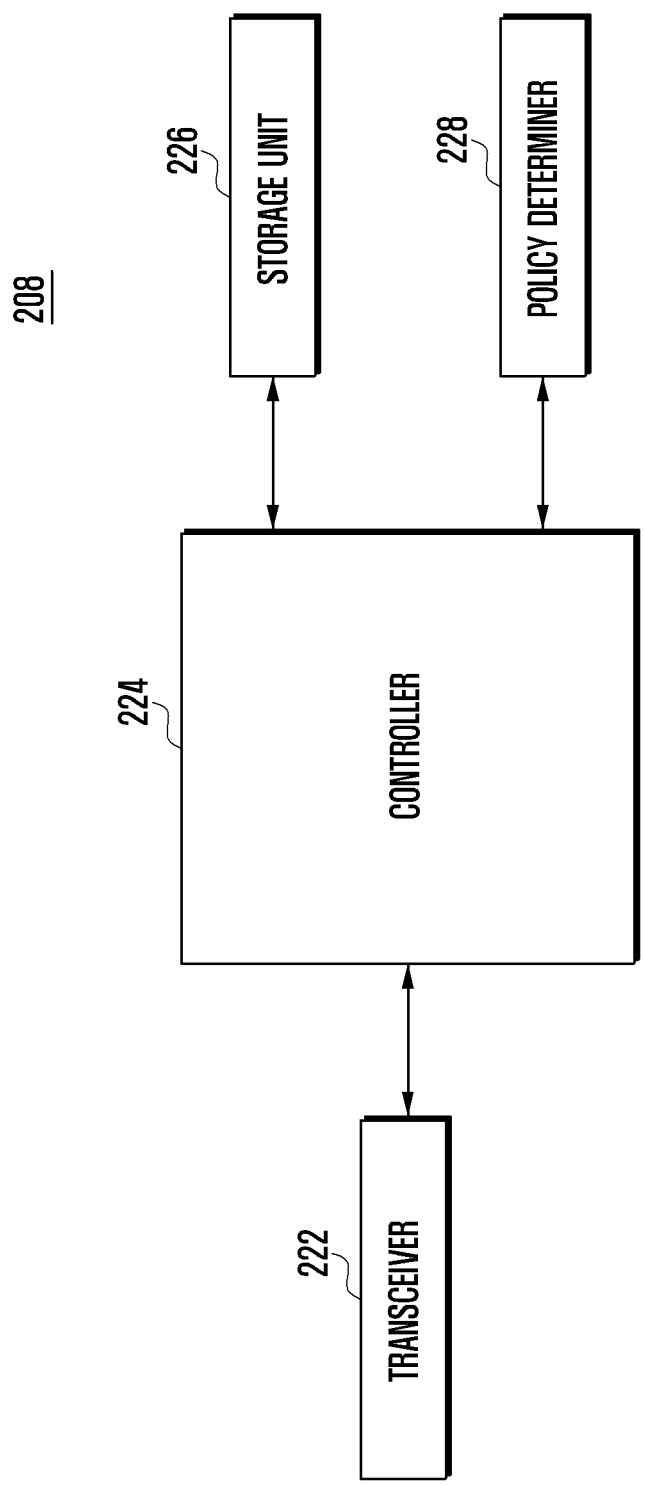
FIG. 13 is a block diagram illustrating a configuration of a PCRF according to an embodiment of the present disclosure.

FIG. 13 illustrates a configuration of the PCRF 208 according to an embodiment of the present invention.

Referring to FIG. 13, the PCRF 208 may include a transceiver 222, a controller 224, a storage unit 226, and a policy determiner 228. The transceiver 222 may transmit and/or receive a signal with the network, and the transmitted and/or received signal may include congestion status information, a congestion status condition, a content request, and other information.

Upon receiving a congestion status information from the ENB 202, the controller 224 may transfer the congestion status information to the content server 300. Upon receiving changed information (i.e., new media transmission parameter) from the content server 300, the policy determiner 228 may determine a policy by using the received information. The storage unit 226 may store the congestion status information, the congestion status condition, the changed information and the policy.

A person having ordinary skill in the art will appreciate that it is possible to implement the present disclosure in any other form without changing the technical idea or the essential characteristics of the present disclosure. Therefore, it should be understood that the above-described various embodiments are illustrative and are not limiting under any possible interpretation. The scope of the present disclosure is defined by the appended claims to be described below, rather than the detailed description. Accordingly, it should be appreciated that all modifications or variations derived from the meaning and scope of the appended claims and their equivalents are included in the scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of determining a policy by a policy and charging rules function (PCRF), the method comprising:
    receiving, by the PCRF, congestion status information of a network from a base station;
    transmitting, by the PCRF, the congestion status information to a content server providing content to a user equipment (UE);
    receiving, by the PCRF, a parameter determined by the content server based on the congestion status information for adjusting traffic transmission characteristics from the content server; and
    determining, by the PCRF, a policy for a congestion status based on the parameter.

2. The method of claim 1, wherein the congestion status information includes at least one of whether a congestion status occurs, a level of the congestion status, information on a cell where the congestion status occurs, identification information of a user equipment, or a transmission parameter allowed in the congestion status.

3. The method of claim 1, wherein the parameter includes at least one of size, quality, or a maximum data rate of a content transmitted by the content server.

4. A policy and charging rules function (PCRF) comprising:
    a transceiver configured to transmit and/or receive a signal with one of a base station and a content server; and
    a controller configured to:
        receive congestion status information of a network from the base station,
        transmit the congestion status information to the content server providing content to a user equipment (UE),
        receive a parameter determined by the content server based on the congestion status information for adjusting traffic transmission characteristics from the content server, and
        determine a policy for a congestion status based on the parameter.

5. The PCRF of claim 4, wherein the congestion status information includes at least one of whether a congestion status occurs, a level of the congestion status, information on a cell where the congestion status occurs, identification information of a user equipment, or a transmission parameter allowed in the congestion status.

6. The PCRF of claim 4, wherein the parameter includes at least one of size, quality, or a maximum data rate of a content transmitted by the content server.

7. A method of controlling a congestion status of a network by a content server that provides content to a user equipment (UE), the method comprising:
    receiving, by the server, congestion status information from a policy and charging rules function (PCRF);
    storing, by the server, the congestion status information;
    upon receiving a service request from the UE, determining, by the server, a parameter for adjusting traffic transmission characteristics based on the congestion status information; and
    transmitting, by the server, the parameter to the PCRF to determine a policy for a congestion status based on the parameter.

8. The method of claim 7, wherein the congestion status information includes at least one of whether a congestion status occurs, a level of the congestion status, information on a cell where the congestion status occurs, identification information of the UE, or a transmission parameter allowed in the congestion status.

9. The method of claim 7, wherein the parameter includes at least one of size, quality, or a maximum data rate of a content transmitted by the content server.

10. The method of claim 7, further comprising transmitting the determined parameter to the UE.

11. The method of claim 7, further comprising transmitting content to the UE based on the determined parameter.

12. A content server that provides content to a user equipment (UE), the content server comprising:
    a transceiver configured to transmit and/or receive a signal with one of the UE and a policy and charging rules function (PCRF); and
    a controller configured to:
        receive congestion status information of a network from the PCRF,
        store the congestion status information,
        determine a parameter for adjusting traffic transmission characteristics based on the congestion status information, when receiving a service request from the UE, and
        transmit the parameter to the PCRF to determine a policy for a congestion status based on the parameter.

13. The content server of claim 12, wherein the congestion status information includes at least one of whether a congestion status occurs, a level of the congestion status, information on a cell where the congestion status occurs, identification information of the UE, or a transmission parameter allowed in the congestion status.

14. The content server of claim 12, wherein the parameter includes at least one of size, quality, or a maximum data rate of a content transmitted by the content server.

15. The content server of claim 12, wherein the controller transmits the determined parameter to the UE.

16. The content server of claim 12, wherein the controller transmits content to the UE based on the determined parameter.

17. A method of determining a transmission priority of an application by a user equipment (UE), the method comprising:
    receiving, by the UE, a policy associated with traffic transmission of the UE in a congestion status from a server;
    determining, by the UE, when application traffic is generated, whether a first application identifier of an application corresponding to the generated application traffic is matched with a second application identifier included in the policy; and determining, by the UE, when the first application identifier of the application corresponding to the generated application traffic is matched with the second application identifier in the policy, a transmission priority order of the application corresponding to the generated application traffic.

18. The method of claim 17, wherein the policy further includes a predetermined use condition, and the method further comprising:
transmitting the determined transmission priority order to a base station when the predetermined use condition is satisfied.

19. The method of claim 18, wherein the use condition includes at least one of a condition indicating that congestion status information is received from a radio access network (RAN) node, a condition indicating that a congestion level included in the congestion status information received from the RAN node is greater than or equal to a reference value, a condition indicating that a current time corresponds to a time period, or a condition indicating that a current location of the UE corresponds to a specific location.

20. A user equipment (UE) that executes an application, the UE comprising:
a transceiver configured to transmit and/or receive a signal with one of a base station and a server; and
a controller configured to:
receive a policy associated with traffic transmission of the UE in a congestion status from the server,
determine whether a first application identifier of an application corresponding to application traffic is matched with a second application identifier included in the policy when the application traffic is generated, and
determine a transmission priority order of the application corresponding to the generated application traffic when the first application identifier of the application corresponding to the generated application traffic is matched with the second application identifier in the policy.

21. The UE of claim 20, wherein the policy includes a predetermined use condition, and the controller is configured to transmit the determined transmission priority order to the base station when the predetermined use condition is satisfied.

22. The UE of claim 21, wherein the use condition includes at least one of a condition indicating that congestion status information is received from a radio access network (RAN) node, a condition indicating that a congestion level included in the congestion status information received from the RAN node is equal to or higher than a predetermined reference value, a condition indicating that a current time corresponds to a predetermined time, or a condition indicating that a current location of the UE corresponds to a specific location.

23. A method of controlling a congestion status of a network by a base station, the method comprising:
transmitting a policy associated with traffic transmission of a user equipment (UE) in a congestion status to the UE;
receiving information on a transmission priority order of an application from the UE; and
transmitting data based on the transmission priority order,
wherein the application is associated with application traffic generated in the UE and an application identifier included in the policy.

24. The method of claim 23, wherein the data transmission is applied to traffic with the same subscription priority or the same bearer QoS class identifier (QCI).

25. The method of claim 23, wherein the transmitting of the data comprises transmitting data while placing a lower transmission priority order on traffic classified as an unattended status.

26. A base station that controls a congestion status of a network, the base station comprising:
a transceiver configured to transmit and/or receive a signal with a user equipment (UE); and
a controller configured to:
transmit a policy associated with traffic transmission of the UE in a congestion status to the UE,
receive information on a transmission priority order of an application from the UE, and
transmit data based on the transmission priority order,
wherein the application is associated with application traffic generated in the UE and an application identifier included in the policy.

27. The base station of claim 26, wherein the controller is further configured to apply the data transmission to traffic with the same subscription priority or the same bearer QoS class identifier (QCI).

28. The base station of claim 26, wherein the controller is further configured to transmit data while placing a lower transmission priority order on traffic classified as an unattended status.

29. The method of claim 17, further comprising:
determining whether the generated traffic is attended based on the policy; and
transmitting, if the generated traffic is attended, the generated traffic to the base station.

30. The UE of claim 20, wherein the controller is further configured to:
determine whether the generated traffic is attended based on the policy, and
transmit the generated traffic to the base station if the generated traffic is attended.

31. The method of claim 23, further comprising:
receiving, if the generated traffic is identified as attended by the UE, the generated traffic from the UE.

32. The base station of claim 26, wherein the controller is further configured to receive the generated traffic from the UE if the generated traffic is identified as attended by the UE.

* * * * *